Patented Apr. 16, 1935

1,997,927

UNITED STATES PATENT OFFICE 1,997,927

METHOD OF PRODUCING AMMONIUM TRINITRATE

Stefan Julius Gelhaar, Ljungaverk, Sweden, assignor to Stockholms Superfosfat Fabriks Aktiebolag, Stockholm, Sweden, a corporation of Sweden No Drawing. Application May 6, 1933, Serial No. 669,793. In Sweden May 21, 1932

2 Claims. (Cl. 23—103)

Ammonium trinitrate is a salt of acid character which contains 1 molecule $NH_3$ on 3 molecules $HNO_3$ and thus having the formula $NH_4 \cdot NO_3 \cdot 2HNO_3$. Heretofore, this salt has only been made subject of a few scientific trials.

The salt then has been made of ammonium nitrate and nitric acid free or approximately free from water. It has thus been considered necessary to use an acid containing 99.8% $HNO_3$ or more which is manufactured by distilling concentrated nitric acid with concentrated sulphuric acid. This known process is disclosed in "Berichte der Deutschen Chemischen Gesellschaft 37./1904/1487" where it is said that the nitric acid used for manufacturing ammonium trinitrate should contain not more than 0.2% of water. The crystallization point of the salt is $+29°$ C. Since now, a highly concentrated nitric acid with 90 to 99% $HNO_3$ can advantageously be produced on an industrial scale, it has been found possible to use such a nitric acid for the manufacture of ammonium trinitrate. The more diluted the acid is the less is the quantity of ammonium trinitrate separated by crystallization. Therefore, it is not convenient to use a nitric acid of a lower concentration than 90% $HNO_3$. An acid containing more than 99.8% $HNO_3$ is expensive to manufacture. The inventor has now, contrary to expectation, found that it is possible to manufacture ammonium trinitrate by means of a nitric acid containing less than 99% $HNO_3$ and suitably between 90 and 99% $HNO_3$. In order to obtain the trinitrate in solid form the mixture must be cooled to the crystallization point of the ammonium trinitrate or below the same.

A solution of ammonium nitrate in nitric acid containing about 90 to 99% of $HNO_3$ is first produced, the quantity of the salt being so adapted that on each molecule of $NH_4 \cdot NO_3$ will come about 2 molecules of $HNO_3$. The trinitrate may also be produced by introducing ammonia into the nitric acid until about one third of the acid is neutralized calculated on $NH_3$. The solution is then cooled down to $+29°$ C. or below that temperature, and the ammonium trinitrate is allowed to crystallize. The salt is thereafter made free from the mother liquor for instance by means of centrifugal separators. The mother liquor can be used for producing further quantities of trinitrate.

As an example it may be indicated that when nitric acid containing 97% $HNO_3$ was mixed with ammonium nitrate, in such quantities that the reaction mixture contained 1 mol. of $NH_4NO_3$ for every 2 mols. of $HNO_3$ 75% of the calculated quantity of ammonium trinitrate crystallized as fully developed crystals, which by means of centrifugal separators easily could be made free from an excess of acid.

By cooling the solution to about $0°$ C. an output of up to 90% of ammonium trinitrate can be obtained by using 97% nitric acid.

Ammonium trinitrate obtained in the above manner is a cheap technical product which may have an extensive technical application, for instance for decomposing raw phosphates so as to obtain a fertilizer containing both nitrogen and phosphoric acid.

I claim:

1. Method of manufacturing ammonium trinitrate, consisting in mixing ammonia with nitric acid containing 90 to 99% of $HNO_3$, adjusting the quantities of the reactants so that the reaction mixture will contain one molecule of $NH_3$ for every three molecules of $HNO_3$ and cooling the solution to a temperature at or below the crystallization point of the ammonium trinitrate formed.

2. Method of manufacturing ammonium trinitrate consisting in mixing ammonium nitrate with nitric acid containing 90–99% of $HNO_3$, adjusting the quantities of the reactants so that the reaction mixture will contain one molecule of $NH_4 \cdot NO_3$ for every two molecules of $HNO_3$, cooling the solution to a temperature below the crystallization point of the ammonium trinitrate, and separating the mother liquor from the crystals of the last mentioned salt.

STEFAN JULIUS GELHAAR.